US010578158B2

(12) United States Patent
Ohtachi et al.

(10) Patent No.: US 10,578,158 B2
(45) Date of Patent: Mar. 3, 2020

(54) VACUUM PUMP AND ABNORMALITY CAUSE ESTIMATING METHOD FOR VACUUM PUMP

(71) Applicant: Edwards Japan Limited, Chiba (JP)

(72) Inventors: Yoshinobu Ohtachi, Chiba (JP); Yasushi Maejima, Chiba (JP); Tsutomu Takaada, Chiba (JP); Manabu Nonaka, Chiba (JP)

(73) Assignee: Edwards Japan Limited, Chiba (JP)

( * ) Notice: Subject to any disclaimer, the term of this patent is extended or adjusted under 35 U.S.C. 154(b) by 408 days.

(21) Appl. No.: 15/521,793

(22) PCT Filed: Nov. 5, 2015

(86) PCT No.: PCT/JP2015/081147
§ 371 (c)(1),
(2) Date: Apr. 25, 2017

(87) PCT Pub. No.: WO2016/076191
PCT Pub. Date: May 19, 2016

(65) Prior Publication Data
US 2017/0248166 A1    Aug. 31, 2017

(30) Foreign Application Priority Data

Nov. 12, 2014   (JP) .................................. 2014-230163

(51) Int. Cl.
*F16C 32/04* (2006.01)
*F04D 19/04* (2006.01)
(Continued)

(52) U.S. Cl.
CPC ........ *F16C 32/0446* (2013.01); *F01D 17/167* (2013.01); *F04D 19/04* (2013.01);
(Continued)

(58) Field of Classification Search
None
See application file for complete search history.

(56) References Cited

U.S. PATENT DOCUMENTS 8,690,525 B2 *  4/2014  Ohtachi ............... F04D 19/042
                                                            415/119
9,534,609 B2 *  1/2017  Becourt ............. G05B 23/0283
(Continued)

FOREIGN PATENT DOCUMENTS

JP    H06330885 A    11/1994
JP    2000074063 A   3/2000
WO    2010007975 A1  1/2010

OTHER PUBLICATIONS

PCT International Search Report for corresponding PCT Application No. PCT/JP2015/081147 dated Feb. 2, 2016.
(Continued)

*Primary Examiner* — Christopher Verdier
*Assistant Examiner* — Jason A Fountain
(74) *Attorney, Agent, or Firm* — Westman, Champlin & Koehler, P.A.; Theodore M. Magee (57) ABSTRACT

Provided are a vacuum pump and a method for the vacuum pump in which, when contact between a rotating body and a stator is sensed, the cause of the contact can be analyzed. Contact determination is made using a threshold for rotating body contact determination for a displacement signal and a threshold for rotating body contact determination for an acceleration signal. The amount of unbalance of a rotating body is determined using a threshold for amount-of-unbalance increase determination for the displacement signal and a threshold for amount-of-unbalance increase determination for the acceleration signal. When, in one of the displacement signal and the acceleration signal, the threshold for amount-of-unbalance increase determination or the threshold for amount-of-unbalance increase determination is exceeded
(Continued)

within a predetermined time before determination of an estimated time point of contact, the contact is determined not to be caused by an increase in accumulation of products.

13 Claims, 7 Drawing Sheets

(51) Int. Cl.
    *F04D 27/02*     (2006.01)
    *F01D 17/16*     (2006.01)
    *F04D 27/00*     (2006.01)
    *F01D 17/02*     (2006.01)
    *F01D 21/00*     (2006.01)
    *F04D 29/058*     (2006.01)

(52) U.S. Cl.
    CPC ......... *F04D 19/042* (2013.01); *F04D 27/001* (2013.01); *F04D 27/0292* (2013.01); *F16C 32/0489* (2013.01); *F01D 17/02* (2013.01); *F01D 21/003* (2013.01); *F04D 29/058* (2013.01); *F05B 2260/80* (2013.01); *F05D 2260/607* (2013.01); *F05D 2260/80* (2013.01); *F16C 2360/45* (2013.01)

(56) References Cited

U.S. PATENT DOCUMENTS

2011/0103934 A1* 5/2011 Ohtachi ................ F04D 19/042
    415/118
2018/0066669 A1* 3/2018 Tsubokawa ............ F04D 19/04

OTHER PUBLICATIONS

PCT Written Opinion for corresponding Application No. PCT/JP2015/081147 dated Feb. 2, 2016.

* cited by examiner

VACUUM PUMP AND ABNORMALITY CAUSE ESTIMATING METHOD FOR VACUUM PUMP

CROSS-REFERENCE TO RELATED APPLICATION

This Application is a Section 371 National Stage Application of International Application No. PCT/JP2015/081147, filed Nov. 5, 2015, which is incorporated by reference in its entirety and published as WO 2016/076191 A1 on May 19, 2016 and which claims priority of Japanese Application No. 2014-230163, filed Nov. 12, 2014.

BACKGROUND OF THE INVENTION

1. Field of the Invention

The present invention relates to a vacuum pump and an abnormality cause estimating method for the vacuum pump, and in particular, to a vacuum pump and an abnormality cause estimating method for the vacuum pump in which, when contact between a rotating body and a stator is sensed, the cause of the contact can be analyzed and properly dealt with.

2. Description of the Related Art

With recent development of electronics, demands for semiconductors such as memories and integrated circuits have been increasing rapidly.

These semiconductors are manufactured by, for example, doping impurities into a semiconductor substrate with a very high purity to provide the semiconductor substrate with electric properties and forming fine circuits on the semiconductor substrate by etching.

These operations need to be performed in a chamber in a high-vacuum state in order to avoid the adverse effect of dust in the air and the like. To exhaust the chamber, a vacuum pump is generally used. In particular, a turbomolecular pump, a type of vacuum pump, is often used due to the small amount of residual gas, easy maintenance and the like.

A manufacturing process for semiconductors includes a large number of steps of allowing various process gases to act on a semiconductor substrate. The turbomolecular pump is used not only to vacuum the chamber but also to exhaust the process gases from the chamber.

The turbomolecular pump has a very small clearance between a stator and a rotating body such as a stator blade that rotates at a high speed. Thus, the rotating body and the stator may contact each other when solid products such as solidified components of the exhaust gas accumulate inside the vacuum pump or when the rotating body is deformed as a result of a creep phenomenon or when wear of a protective bearing progresses.

When the rotating body and the stator are left in contact with each other without maintenance (overhaul), a serious defect may occur.

Thus, maintenance timing is conventionally predicted using a technique described in Japanese Patent No. 3457353. Execution of maintenance is urged at a proper timing to prevent the turbomolecular pump from being made non-reusable.

However, the technique described in Japanese Patent No. 3457353 fails to discriminate an increase in vibration amplitude due to temporally increased unbalance of the rotating body from an increase in vibration amplitude due to the physical contact between the rotating body and the stator.

The technique described in Japanese Patent No. 3457353 also fails to discriminate an increase in vibration amplitude due to mechanical vibration associated with, for example, opening and closing of a vacuum valve to which the pump is connected, or external impact (disturbance) applied to the pump or an apparatus such as a vacuum container to which the pump is connected, from an increase in vibration amplitude due to the physical contact between the rotating body and the stator.

Thus, in WO 2010/007975, the contact between the rotating body and the stator is determined using a vibration sensor such as acceleration pickup which is attached to the stator, in order to accurately sense that the amount of solid products accumulated has become equal to the clearance between the rotating body and the stator. This allows the physical contact between the rotating body and the stator to be accurately detected.

However, the method according to WO 2010/007975 disadvantageously needs to use a band-pass filter and a fixing method using an elastic member in order to enhance reliability of a vibration signal from the stator.

The present invention has been developed in consideration of the above-described conventional problems. An object of the present invention is to provide a vacuum pump and an abnormality cause estimating method for the vacuum pump in which, when contact between a rotating body and a stator is sensed, the cause of the contact can be analyzed and properly dealt with.

The discussion above is merely provided for general background information and is not intended to be used as an aid in determining the scope of the claimed subject matter.

The claimed subject matter is not limited to implementations that solve any or all disadvantages noted in the background.

SUMMARY OF THE INVENTION

An aspect of the present invention (claim 1) is a vacuum pump including a rotating body displacement detecting means for detecting displacement of a rotating body as a signal, a threshold for rotating body displacement which is set for the signal for the displacement, a contact determining means for determining a time point when the signal for the displacement exceeds the threshold for rotating body displacement to be an estimated time point of contact, a storing means for storing the signal for the displacement, a threshold for rotating body stored displacement which is set for the signal for the displacement obtained before the estimated time point of contact and stored in the storing means, and an abnormality cause estimating means for estimating a cause of the contact depending on whether or not the signal for the displacement obtained before the estimated time point of contact and stored in the storing means exceeds the threshold for rotating body stored displacement.

Whether or not the displacement signal obtained before the estimated time point has exceeded the threshold for rotating body stored displacement is determined to allow discrimination of contact based only on the displacement signal without the need to install a vibration sensor. That is, when the value of the displacement signal exceeds the threshold for rotating body stored displacement within the predetermined time before the estimated time point of contact, the contact is determined to be caused by an increase in the amount of unbalance or an external impact and not to be caused by an increase in accumulation of products.

As described above, the state of the physical contact between the rotating body and the stator can be perceived without the need to add a vibration sensor or an elastic member. Furthermore, the cause of the contact can be determined. Determination of the cause enables proper action to be taken.

Another aspect of the present invention (claim 2) is a vacuum pump including a stator portion physical quantity detecting means for detecting a physical quantity of a stator portion as a signal, a threshold for stator portion physical quantity which is set for the signal for the physical quantity, a contact determining means for determining a time point when the signal for the physical quantity exceeds the threshold for stator portion physical quantity to be an estimated time point of contact, a rotating body displacement detecting means for detecting displacement of a rotating body as a signal, a storing means for storing the signal for the displacement, a threshold for rotating body stored displacement which is set for the signal for the displacement obtained before the estimated time point of contact and stored in the storing means, and an abnormality cause estimating means for estimating a cause of the contact depending on whether or not the signal for the displacement obtained before the estimated time point of contact and stored in the storing means exceeds the threshold for rotating body stored displacement.

The time point when the signal for the physical quantity of the stator portion exceeds the threshold for stator portion physical quantity is determined to be the estimated time point of contact. The signal for the physical quantity of the stator portion is, for example, displacement, speed, or acceleration of the stator portion.

When the acceleration of the stator portion is detected by a vibration sensor, the acceleration signal and a displacement signal from a displacement sensor are utilized to allow the state of the physical contact between the rotating body and the stator to be accurately perceived. Therefore, a proper timing for overhaul can be determined based on accumulation of products. Determination of the cause enables the proper action to be taken.

In the vacuum pump of the present invention (claim 3), the physical quantity of the stator portion is acceleration of the stator portion or force acting on the stator portion.

In the vacuum pump of the present invention (claim 4), the physical quantity of the stator portion is a physical quantity corresponding to a result of a predetermined number of differentiations or integrations of acceleration of the stator portion.

In the vacuum pump of the present invention (claim 4), the abnormality cause estimating means estimates that a contact is caused by external impact or accumulation of products when the signal for the displacement obtained before the estimated time point of contact and stored in the storing means does not exceed the threshold for rotating body stored displacement.

In the vacuum pump of the present invention (claim 6), the vacuum pump includes a storing means for storing the physical quantity and a threshold for stator portion stored physical quantity which is set for the signal for the physical quantity obtained before the estimated time point of contact and stored in the storing means, and the abnormality cause estimating means estimates that a contact is caused by external impact or accumulation of products when the signal for the physical quantity obtained before the estimated time point of contact and stored in the storing means does not exceed the threshold for stator portion stored physical quantity.

In the vacuum pump of the present invention (claim 7), at or after the estimated time point of contact, the cause of the contact is estimated to be accumulation of products based on a difference between a maximum value of a displacement of the rotating body and an amount of clearance between the rotating body and a stator portion opposite to the rotating body or a predetermined value that is set based on the amount of clearance.

The above-described configuration allows the cause of the contact to be estimated to be accumulation of products. Therefore, the proper timing for overhaul can be determined based on accumulation of products. Determination of the cause enables the proper action to be taken.

In the vacuum pump of the present invention (claim 8), the cause of the contact is estimated based on a number of times that the signal for the displacement obtained before the estimated time point of contact and stored in the storing means exceeds the threshold for rotating body stored displacement.

Yet another aspect of the present invention (claim 9) is an abnormality cause estimating method for a vacuum pump, the method including detecting displacement of a rotating body as a signal, storing the signal for the displacement in a storing means, determining a time point when the signal for the displacement exceeds a threshold for rotating body displacement to be an estimated time point of contact, and estimating a cause of the contact depending on whether or not the signal for the displacement obtained before the estimated time point of contact and stored in the storing means exceeds a threshold for rotating body stored displacement.

Still another aspect of the present invention (claim 10) is an abnormality cause estimating method for a vacuum pump, the method including detecting a physical quantity of a stator portion as a signal, storing the signal for the physical quantity in a storing means, determining a time point when the signal for the physical quantity exceeds a threshold for stator portion physical quantity to be an estimated time point of contact, and estimating a cause of the contact depending on whether or not the signal for the physical quantity obtained before the estimated time point of contact and stored in the storing means exceeds a threshold for stator portion stored physical quantity.

As described above, according to the present invention, the vacuum pump includes the contact determining means for determining the time point when the signal for the displacement exceeds the threshold for rotating body displacement to be the estimated time point of contact, and the abnormality cause estimating means for estimating the cause of the contact depending on whether or not the displacement signal obtained before the estimated time point of contact exceeds the threshold for rotating body stored displacement. Thus, the state of the physical contact between the rotating body and the stator can be perceived without the need to add a vibration sensor or an elastic member. Furthermore, the cause of the contact can be determined. Determination of the cause enables the proper action to be taken.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DESCRIPTION OF THE PREFERRED EMBODIMENTS

Figure 1:
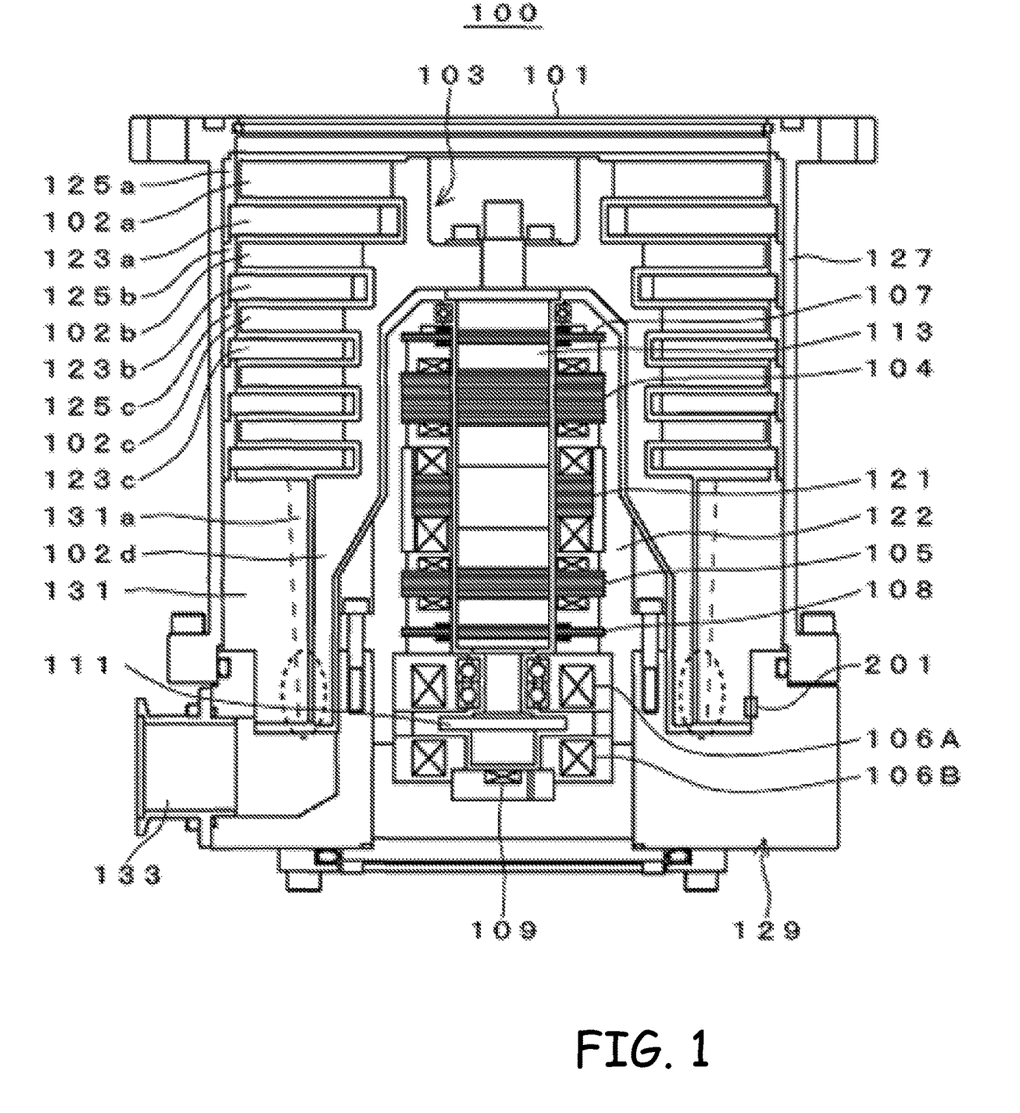
FIG. 1 is a diagram of a configuration of a turbomolecular pump.

An embodiment of the present invention will be described below. FIG. 1 depicts a configuration of the embodiment of the present invention. In FIG. 1, an inlet port 101 is formed at an upper end of a cylindrical outer cylinder 127 of a turbomolecular pump 100. The outer cylinder 127 is formed of, for example, metal such as aluminum, iron, stainless steel, or copper or alloy containing the metal as a component. The outer cylinder 127 contains a rotating body 103 including a plurality of rotor blades 102a, 102b, 102c, . . . that are turbine blades configured to suck and exhaust gas such that the rotor blades are radially arranged in a stepwise fashion. The rotating body 103 is formed of, for example, aluminum, iron, stainless steel, or copper or alloy containing the metal as a component.

A rotor shaft 113 is attached to the center of the rotating body 103 and is supported so as to float in the air and controllably positioned, for example, by a magnetic bearing for what is called five-axis control.

An upper radial electromagnet 104 includes four electromagnets forming two pairs arranged along an X axis and a Y axis that are radial coordinate axes of the rotor shaft 113 and that are orthogonal to each other. An upper radial sensor 107 is provided which includes four electromagnets arranged in proximity to and in association with the upper radial electromagnet 104. The upper radial sensor 107 is configured to detect radial displacement of the rotating body 103 to transmit a detected displacement signal to a control apparatus not depicted in the drawings.

Based on the displacement signal detected by the upper radial sensor 107, the control apparatus controls excitation of the upper radial electromagnet 104 via a compensation circuit with a PID adjusting function to adjust an upper radial position of the rotor shaft 113.

The rotor shaft 113 is formed of, for example, a high-permeability material (iron or the like) and configured to be sucked by a magnetic force of the upper radial electromagnet 104. The above-described adjustment is performed independently in an X-axis direction and in a Y-axis direction.

A lower radial electromagnet 105 and a lower radial sensor 108 are arranged similarly to the upper radial electromagnet 104 and the upper radial sensor 107 to adjust a lower radial position of the rotor shaft 113 as is the case with the upper radial position.

Moreover, axial electromagnets 106A, 106B are arranged such that a disc-shaped metal disc 111 provided at a lower portion of the rotor shaft 113 is sandwiched between the axial electromagnets 106A, 106B in a vertical direction. The metal disc 111 is formed of a high-permeability material such as iron. An axial sensor 109 is provided in order to detect axial displacement of the rotor shaft 113 and configured such that an axial displacement signal from the axial sensor 109 is transmitted to the control apparatus not depicted in the drawings.

Based on the axial displacement signal, the axial electromagnets 106A, 106B are controllably excited via the compensation circuit included in the control apparatus and having the PID adjusting function. The axial electromagnet 106A and the axial electromagnet 106B magnetically suck the metal disc 111 upward and downward, respectively.

As described above, the control apparatus appropriately adjusts the magnetic force exerted on the metal disc 111 by the axial electromagnets 106A, 106B to magnetically float the rotor shaft 113 in an axial direction to hold the rotor shaft 113 in space in a non-contact manner.

A motor 121 includes a plurality of magnet poles circumferentially arranged so as to surround the rotor shaft 113. Each of the magnetic poles is controlled by the control apparatus not depicted in the drawings so as to rotationally drive the rotor shaft 113 via electromagnetic force exerted between the magnetic pole and the rotor shaft 113.

A plurality of stator blades 123a, 123b, 123c, . . . is disposed over the rotor blades 102a, 102b, 102c, . . . respectively, such that a slight void is formed between each of stator blades and the corresponding rotor blade. The stator blades 123 are formed of, for example, metal such as aluminum, iron, stainless steel, or copper or alloy containing the metal as a component. To transport molecules of exhaust gas downward as a result of collision, the rotor blades 102a, 102b, 102c, . . . are formed to incline at a predetermined angle to a plane perpendicular to an axis of the rotor shaft 113.

The stator blades 123 are similarly formed to incline at the predetermined angle to the plane perpendicular to the axis of the rotor shaft 113 and disposed alternately with the steps of the rotator blades 102 so as to extend inward in the outer cylinder 127.

One end of each stator blade 123 is supported so as to be fitted and inserted between a plurality of stacked stator blade spacers 125a, 125b, 125c, . . . .

The stator blade spacers 125 are ring-shaped members and formed of, for example, metal such as aluminum, iron, stainless steel, or copper or alloy containing the metal as a component.

The outer cylinder 127 is fixed to an outer periphery of the stator blade spacers 125 via a slight void. A base portion 129 is disposed at a bottom portion of the outer cylinder 127. A threaded spacer 131 is disposed between the lower portion of the stator blade spacers 125 and the base portion 129. In the base portion, an outlet port 133 is formed under the threaded spacer 131 to communicate with the outside.

The threaded spacer 131 is a cylindrical member formed of metal such as aluminum, iron, stainless steel, or copper or alloy containing the metal as a component, and has a plurality of spiral thread grooves 131a formed in an inner peripheral surface of the threaded spacer 131.

The direction of the spirals of the thread grooves 131a is the direction in which, in migrating in a rotating direction of the rotating body 103, molecules of exhaust gas are transported toward the outlet port 133.

A rotating cylinder 102d hangs down in the lowest portion of the rotating body 103 following the rotor blades 102a, 102b, 102c, . . . . An outer peripheral surface of the rotating cylinder 102d is cylindrical, projects toward the inner peripheral surface of the threaded spacer 131, and lies in proximity to the inner peripheral surface of the threaded spacer 131 with a predetermined clearance therebetween.

The base portion 129 is a disc-shaped member forming a bottom portion of the turbomolecular pump 100 and is generally formed of metal such as iron, aluminum, stainless steel, or copper.

The base portion 129 physically holds the turbomolecular pump 100 and also functions as a heat conduction path. Thus, the base portion is desirably formed of metal such as iron, aluminum, or copper which is rigid and which has a high heat conductivity.

In such a configuration, when the rotating body 103 is driven by the motor 121 to rotate along with the rotor shaft 113, the rotor blades 102 and the stator blades 123 act to suck exhaust gas from the chamber through the inlet port 101.

The exhaust gas sucked through the inlet port 101 flows between the rotor blades 102 and the stator blades 123 and is transported to the base portion 129. At this time, due to, for example, frictional heat resulting from contact or collision of exhaust gas with the rotor blades 102 or conduction or radiation of heat from the motor 121, the temperature of the rotor blades 102 rises, with the resultant heat transferred to the stator blades 123 due to radiation or conduction of, for example, gaseous molecules of the exhaust gas.

The stator blade spacers 125 are joined together at the outer peripheral portion to transfer, for example, heat received from the rotor blades 102 by the stator blades 123 or frictional heat resulting from contact or collision of exhaust gas with the stator blades 123, to the outer cylinder 127 and the threaded spacer 131.

The exhaust gas transported to the threaded spacer 131 is carried to the outlet port 133 while being guided through the thread groove 131a.

To prevent the gas sucked through the inlet port 101 from entering an electrical component side including the motor 121, the lower radial electromagnet 105, the lower radial sensor 108, the upper radial electromagnet 104, the upper radial sensor 107, and the like, the electric unit is surrounded by a stator column 122. The inside of the electrical component portion is kept at a predetermined pressure with purge gas.

In this case, solid products such as solidified components of the exhaust gas are likely to solidify on or attach to a low-temperature area near the outlet port 133, particularly an area near the rotating cylinder 102d and the threaded spacer 131, the range of which is denoted by a dotted ellipse in FIG. 1.

In FIG. 1, a vibration sensor 201 such as an accelerator pickup is embedded in the threaded spacer 131 or the base portion 129. However, as described below, the vibration sensor 201 may be omitted.

Now, an aspect of physical contact between the stator and the rotor blades will be described.

As described above, three aspects are present for the physical contact between each rotor blade 102 and the stator portion including the threaded spacer 131 and the stator blades 123.

First Aspect

Contact Caused by External Impact

In a first aspect, the contact is caused by external impact. The external impact is transmitted to the rotating body 103 side via the outer cylinder 127, the base portion 129, and the stator column 122 and via magnetic support provided by the magnetic bearings 104, 105, 106. This transmission of vibration to the rotating body 103 is expected to be due to vibration of the stator following the external impact based on detection of relative displacement between the rotor shaft 113 and the stator by the upper radial sensor 107, the lower radial sensor 108, and the axial sensor 109, which detection allows vibration of the stator to follow the external impact.

Figure 2:
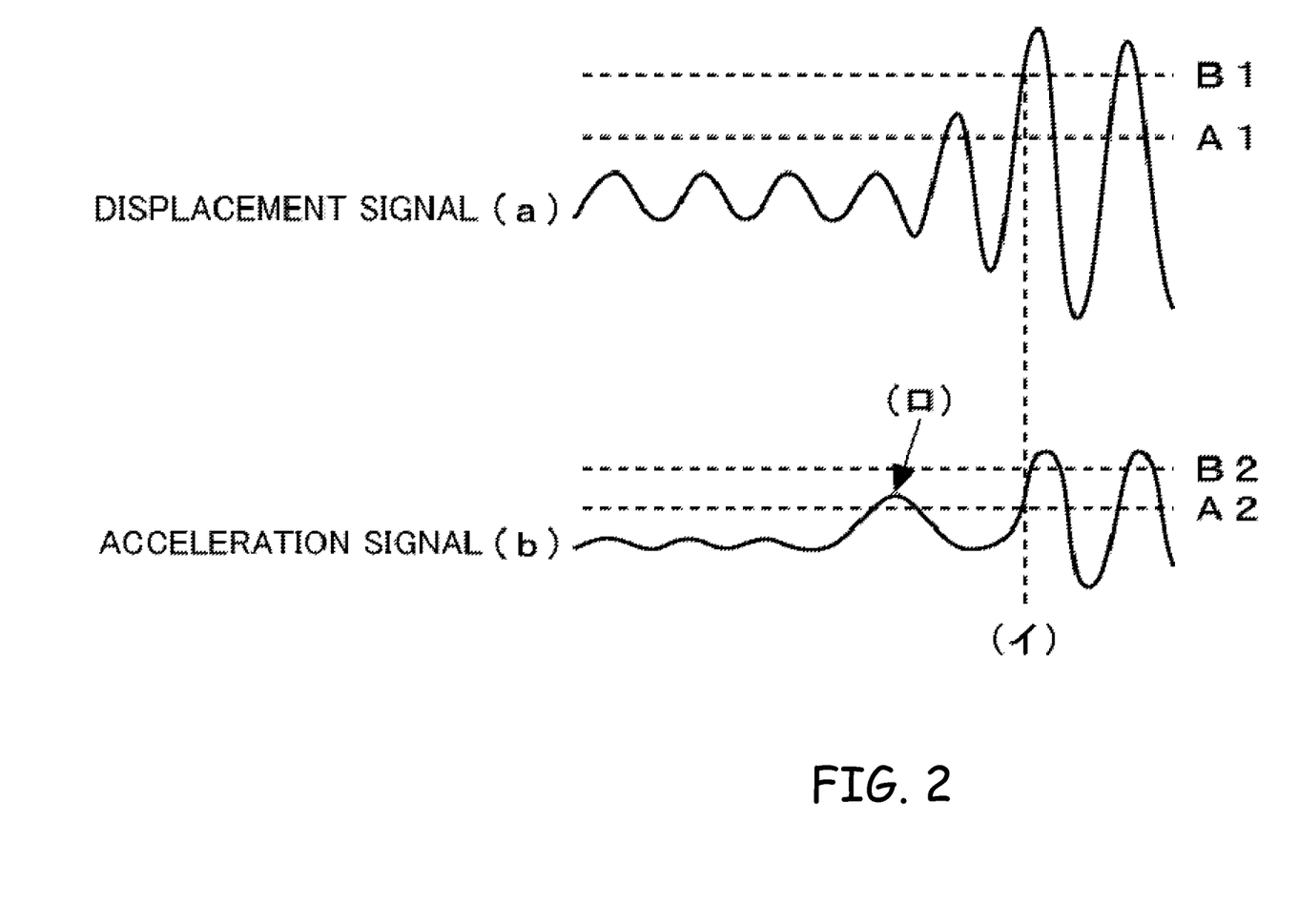
FIG. 2 is a signal flow diagram (a case where contact is caused by external impact)

When the vibration resulting from the external impact is transmitted to the pump, a displacement signal increases rapidly at about a time point (t1) when a threshold for rotating body contact determination B1 (corresponding to a threshold for rotating body displacement) is exceeded to cause the vibration to start to be transmitted to the rotating body 103 side as illustrated in a signal flow diagram (a) in FIG. 2. The threshold for rotating body contact determination B1 is provided to determine an estimated time point of contact of the rotating body 103. The estimated time point means the time point of possible actual contact. A threshold for amount-of-unbalance increase determination A1 (corresponding to a threshold for rotating body stored displacement) is provided to determine the amount of unbalance of the rotating body 103. The displacement signal is detected by the upper radial sensor 107, the lower radial sensor 108, and the axial sensor 109.

On the other hand, an acceleration signal (b) in a signal flow diagram in FIG. 2 is detected by the vibration sensor 201. The acceleration signal (b) is extracted (at about a time point (t2)) as vibration of the stator before the estimated time point of contact (t1) when the vibration resulting in the contact exceeds the threshold for rotating body contact determination B1 for the displacement signal. The magnitude of this vibration exceeds a threshold for amount-of-unbalance increase determination A2. The contact of the rotating body 103 with the stator can also be determined (at about the time point (t1)) based on an increase in the signal detected by the vibration sensor 201 above a threshold for rotating body contact determination B2 (corresponding to a threshold for stator portion physical quantity).

The threshold for rotating body contact determination B2 is provided to determine the estimated time point of contact of the rotating body 103 based on the signal from the vibration sensor 201. The threshold for amount-of-unbalance increase determination A2 is provided to determine whether or not the contact of the rotating body 103 is caused by an increase in the amount of unbalance, based on the signal from the vibration sensor 201.

Second Aspect

Contact Caused by an Increase in the Amount of Unbalance)

In a second aspect, the contact is caused by an increase in the amount of unbalance of the rotating body. For example, if the amount of unbalance of the rotating body 103 increases due to, for example, aging of the rotating body 103, the displacement signal significantly fluctuates before the estimated time point of contact (t1) when the displacement signal exceeds the threshold for rotating body contact determination B1 as illustrated in a signal flow diagram (a) in FIG. 3. The displacement signal further increases at about the estimated time point of contact (t1). The magnitude of this vibration even exceeds the threshold for amount-of-unbalance increase determination A1.

Figure 3:
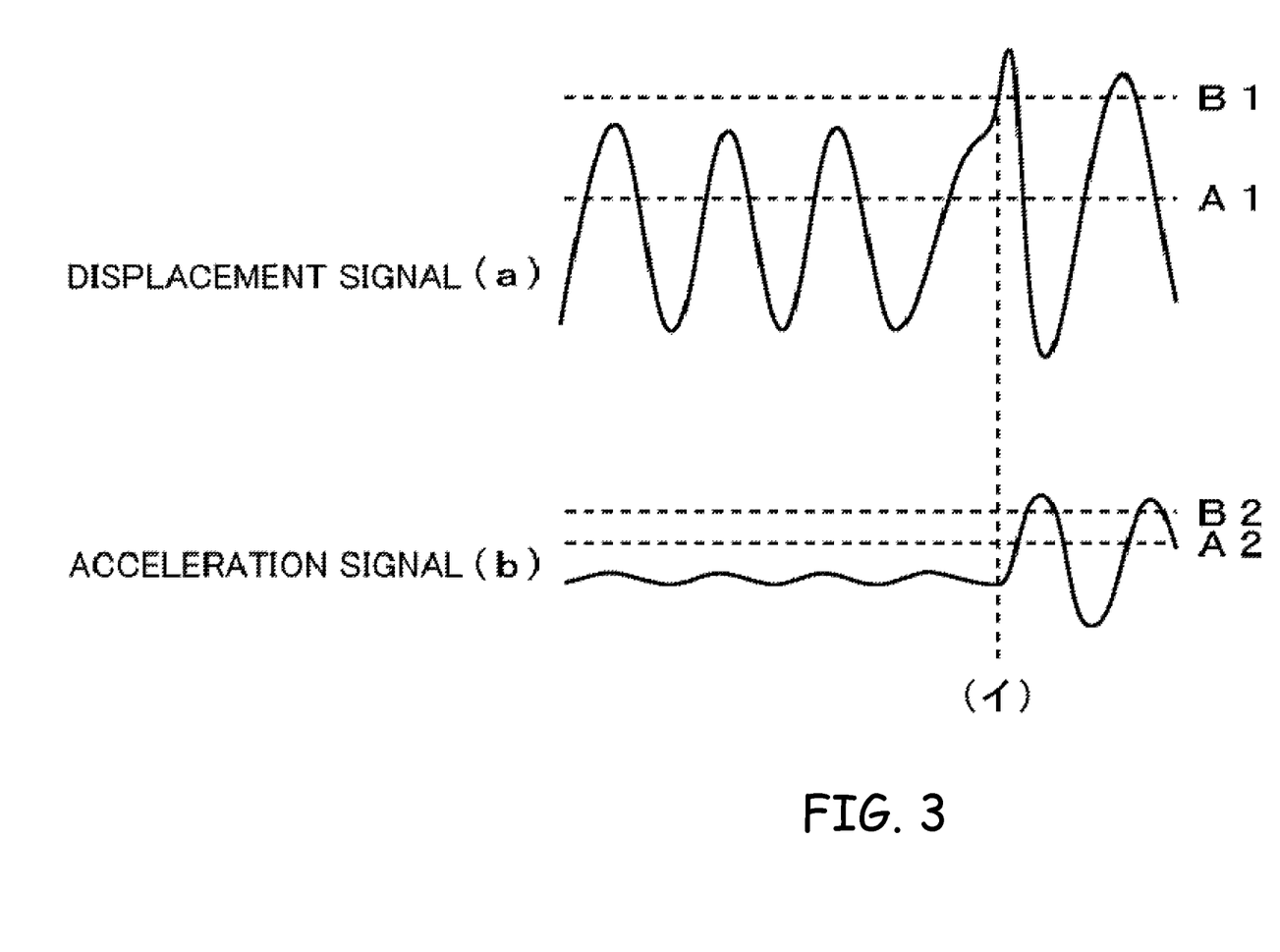
FIG. 3 is a signal flow diagram (a case where contact is caused by an increase in the amount of unbalance of a rotating body)

On the other hand, before the contact, an increase in displacement resulting from an increased amount of unbalance does not substantially affect the vibration applied to the stator, and thus, an acceleration signal (b) in a signal flow diagram in FIG. 3 does not exceed the threshold for amount-of-unbalance increase determination A2.

Third Aspect

Contact Caused by Accumulation of Products

In a third aspect, the contact is caused by accumulation of products.

Figure 4:
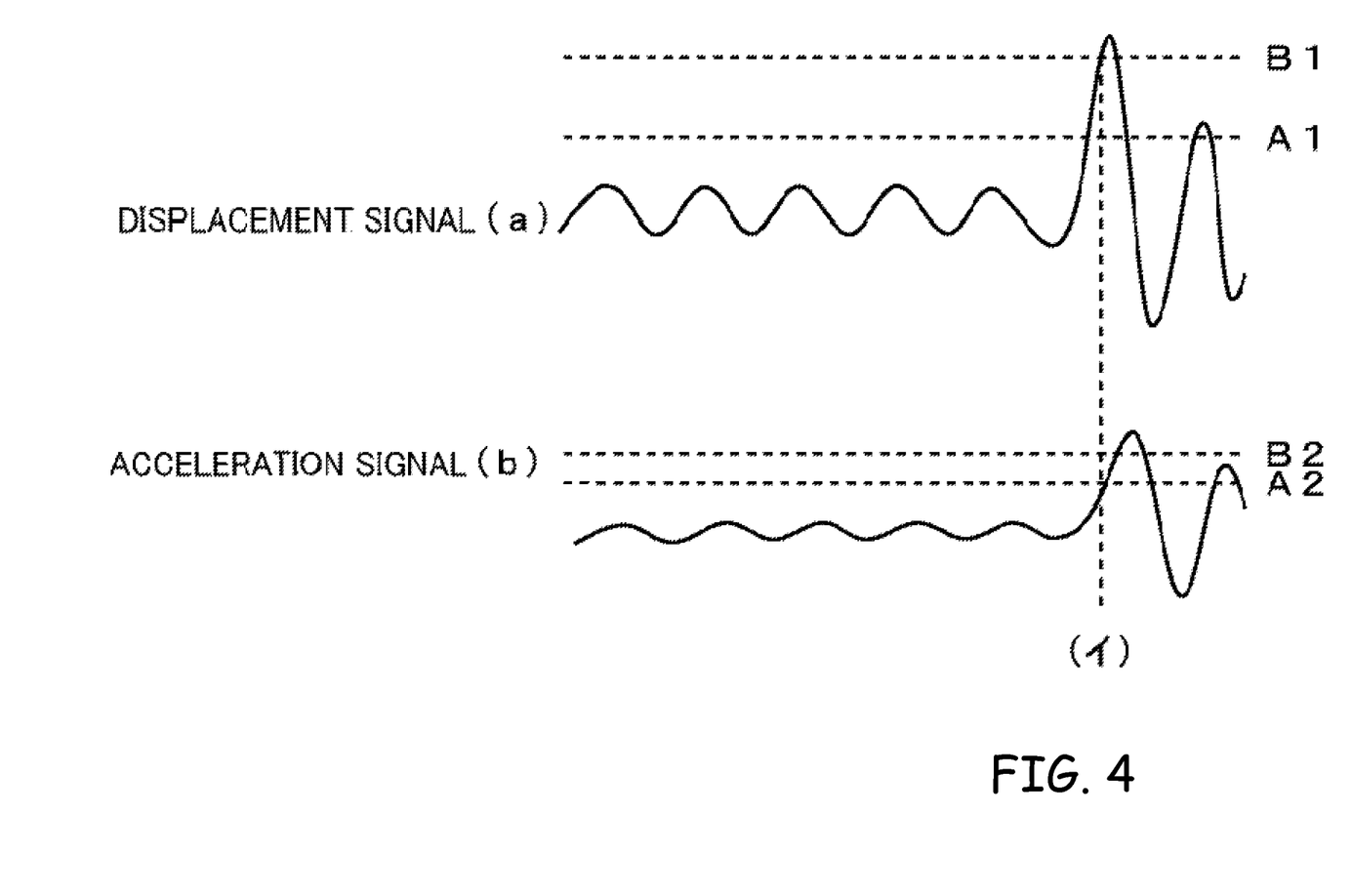
FIG. 4 is a signal flow diagram (contact is caused by accumulation of products)

When products accumulate on the stator, the displacement signal changes rapidly to exceed the threshold for rotating body contact determination B1 as illustrated in a signal flow diagram (a) in FIG. 4. On the other hand, before the contact, the contact caused by accumulation of products does not substantially affect the vibration applied to the stator, and thus, an acceleration signal (b) in a signal flow diagram in FIG. 4 does not exceed the threshold for amount-of-unbalance increase determination A2.

Embodiment 1

A method for discriminating the physical contact between each rotor blade and the stator will be described. First, a case will be described where the vibration sensor 201 is installed on the stator to discriminate the contact by utilizing both the displacement signal and the acceleration signal.

For the displacement signal and the acceleration signal, for example, approximately 100 ms of data obtained before the estimated time point of contact (t1) is stored.

The duration of data storage is a value set based on a rotation speed (for example, 20,000 to 60,000 rpm) and is desirably set to a duration before the contact determination during which at least 10 periods of signal data can be acquired.

The contact is determined using the threshold for rotating body contact determination B1 for the displacement signal and the threshold for rotating body contact determination B2 for the acceleration signal. The amount of unbalance of a rotating body 103 is determined using the threshold for amount-of-unbalance increase determination A1 for the displacement signal and the threshold for amount-of-unbalance increase determination A2 for the acceleration signal.

The contact is determined not to be caused by an increase in accumulation of products if one of the displacement signal and the acceleration signal exceeds the threshold for amount-of-unbalance increase determination A1 or the threshold for amount-of-unbalance increase determination A2 within a predetermined time (for example, 100 ms) before the estimated time point of contact (t1) is determined.

Embodiment 1-1

Determination of the Contact to be Caused by External Impact

In this case, vibration caused by external impact as illustrated in FIG. 2 may be determined to have occurred if the displacement signal exceeds the threshold for amount-of-unbalance increase determination A1 and the acceleration signal also exceeds the threshold for amount-of-unbalance increase determination A2.

Embodiment 1-2

Determination of the Contact to Be Caused by an Increase in the Amount of Unbalance Vibration caused by an increase in the amount of unbalance as illustrated in FIG. 3 may be determined to have occurred if the displacement signal exceeds the threshold for amount-of-unbalance increase determination A1 but the acceleration signal does not exceed the threshold for amount-of-unbalance increase determination A2.

Embodiment 1-3

Determination of the Contact to Be Caused by an Increase in Accumulation of Products The contact is determined to be caused by an increase in accumulation of products if neither the threshold for amount-of-unbalance increase determination A1 nor the threshold for amount-of-unbalance increase determination A2 is exceeded within the predetermined time.

As described above, the state of the physical contact between the rotating body 103 and the stator can be accurately perceived by utilizing the acceleration signal from the vibration sensor 201 and the displacement signal from the upper radial sensor 107, the lower radial sensor 108, and the axial sensor 109. Furthermore, the cause of the contact can be determined.

Embodiment 2

Now, a method for discriminating the contact based only on the displacement signal without the need to install the vibration sensor 201 will be described.

In this case, the estimated time point of contact is determined using only the threshold for rotating body contact determination B1 for the displacement signal.

Embodiment 2-1

Determination of the Contact to be Caused by External Impact or an Increase in the Amount of Unbalance If the value of the displacement signal exceeds the threshold for amount-of-unbalance increase determination A1 within the predetermined time (for example, 100 ms) before the estimated time point of contact (t1), the contact is determined to be caused by external impact in the first aspect or an increase in the amount of unbalance of the rotating body in the second aspect and not to be caused by an increase in accumulation of products.

Embodiment 2-2(a)

Determination of the Contact to be Caused by an Increase in Accumulation of Products On the other hand, the contact is determined to be caused by accumulation of products in the third aspect if the value of the displacement signal does not exceed the threshold for amount-of-unbalance increase determination A1 within the predetermined time (for example, 100 ms) before the estimated time point of contact (t1).

Further, whether the contact is caused by external impact or an increase in the amount of unbalance can be determined by setting the threshold for amount-of-unbalance increase determination A1 to such a value as allows the external impact to be discriminated from the increase in the amount of unbalance.

For example, when the threshold for amount-of-unbalance increase determination A1 for amount-of-unbalance increase determination is set to a large value (close to the threshold for rotating body contact determination B1), it is possible to determine whether displacement of the rotating body has occurred which involves consecutive large amplitudes and which allows the contact to be determined to be caused by an increase in the amount of unbalance.

External impact is expected to increase the amplitude rapidly before the contact determination as depicted in FIG. 2, and can thus be identified through comparison of the number of times that the threshold for amount-of-unbalance increase determination A1 is exceeded within the predetermined time before the contact determination.

Specifically, with an increase in the amount of unbalance, the peak values of substantially all the displacement signals are expected to exceed the threshold for amount-of-unbalance increase determination A1 within the predetermined time before the estimated time point of contact (t1). Thus, the number of times that the displacement signal resulting from an increase in the amount of unbalance exceeds the threshold for amount-of-unbalance increase determination A1 is expected to be significantly larger than the number of times that the displacement signal resulting from external impact exceeds the threshold for amount-of-unbalance increase determination A1.

Embodiment 2-2(b)

Determination of the Contact to be Caused by an Increase in Accumulation of Products Now, a method will be described in which the contact caused by external impact in the first aspect or an increase in the amount of unbalance in the second aspect is discriminated from the contact caused by accumulation of products in the third aspect without the need to install the vibration sensor 201.

Figure 5:
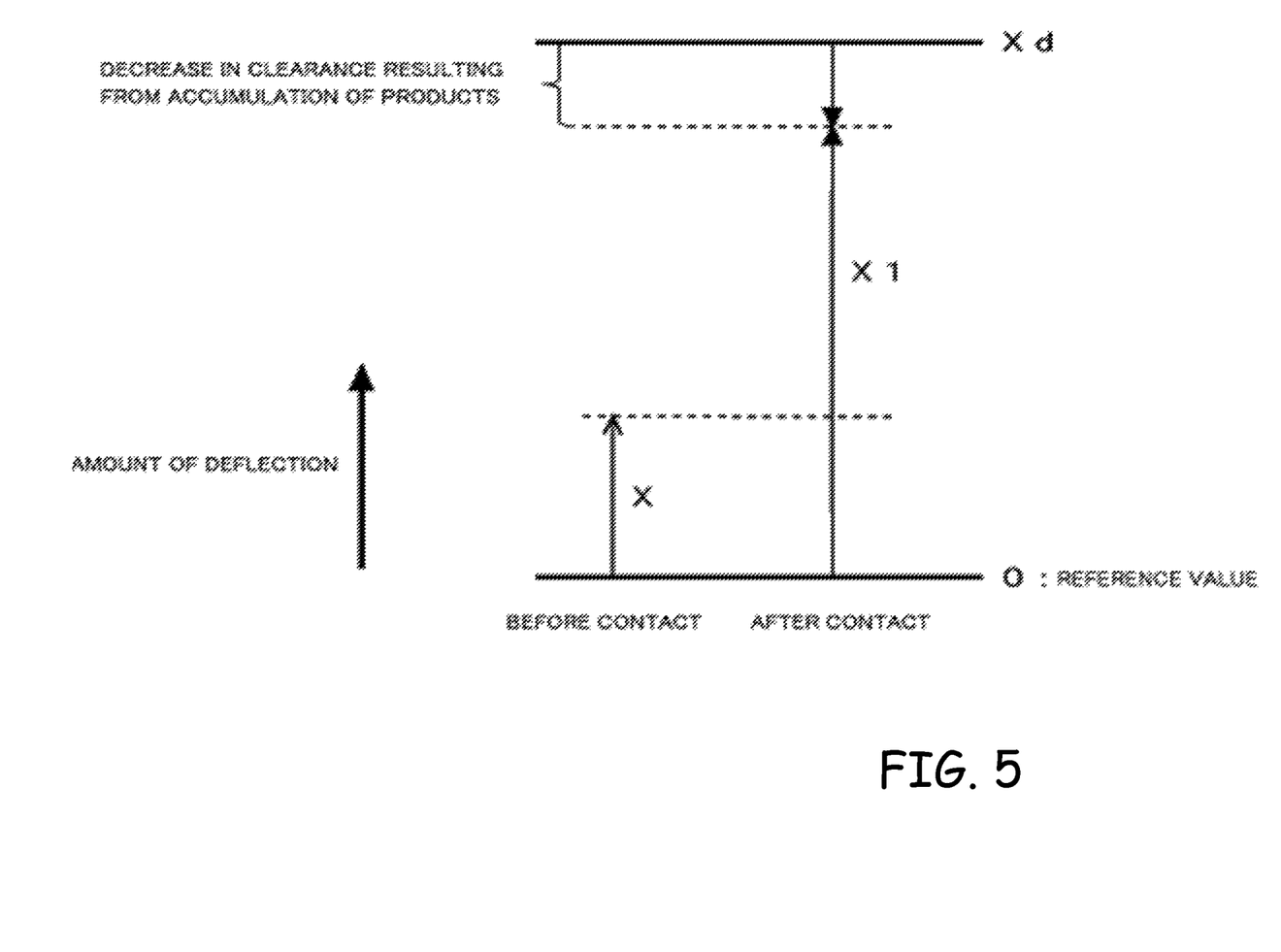
FIG. 5 is a diagram illustrating a relation between clearance in mechanical design and displacement of the rotating body which relation is observed when products are accumulated.

FIG. 5 illustrates a relation between clearance in mechanical design and the rotating body which relation is observed when products are accumulated. A largest amount of products are expected to accumulate on an area located near the rotating cylinder 102d and the threaded spacer 131, the range of which is denoted by a dotted ellipse in FIG. 1. Thus, the following description is based on the assumption that, for example, clearance in mechanical design making the rotating body movable is set for this area.

Figure 6:
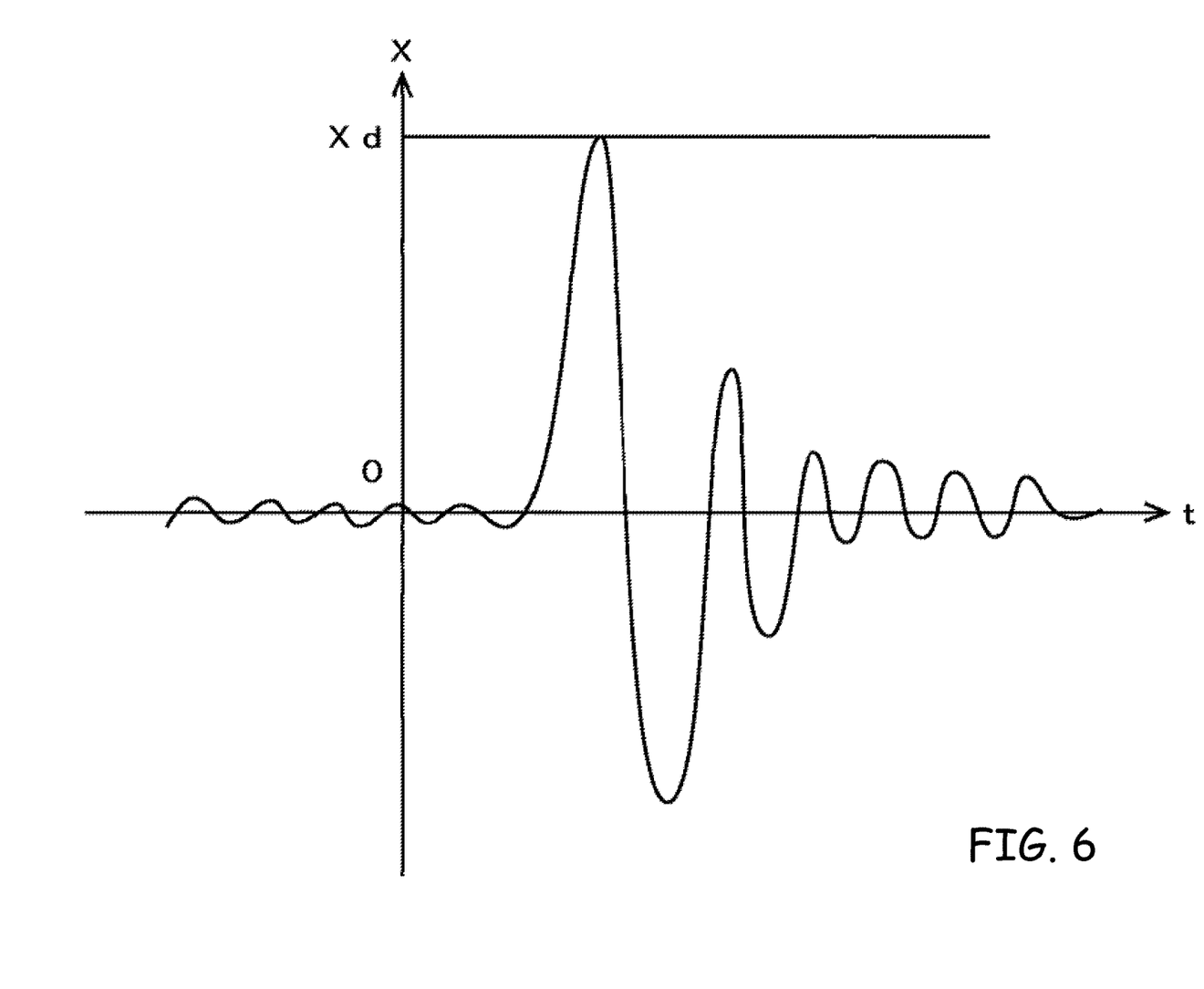
FIG. 6 is a diagram illustrating a relation between clearance and displacement of the rotating body which relation is observed when no products are accumulated.

Essentially, if no products attach to the threaded spacer 131, the rotating body 103 should be able to be displaced until the displacement X is equal to the full clearance as illustrated in FIG. 6. That is, when the magnitude of the clearance is denoted by Xd (corresponding to the amount of clearance), the maximum displacement X of the rotating body 103=clearance Xd.

Figure 7:
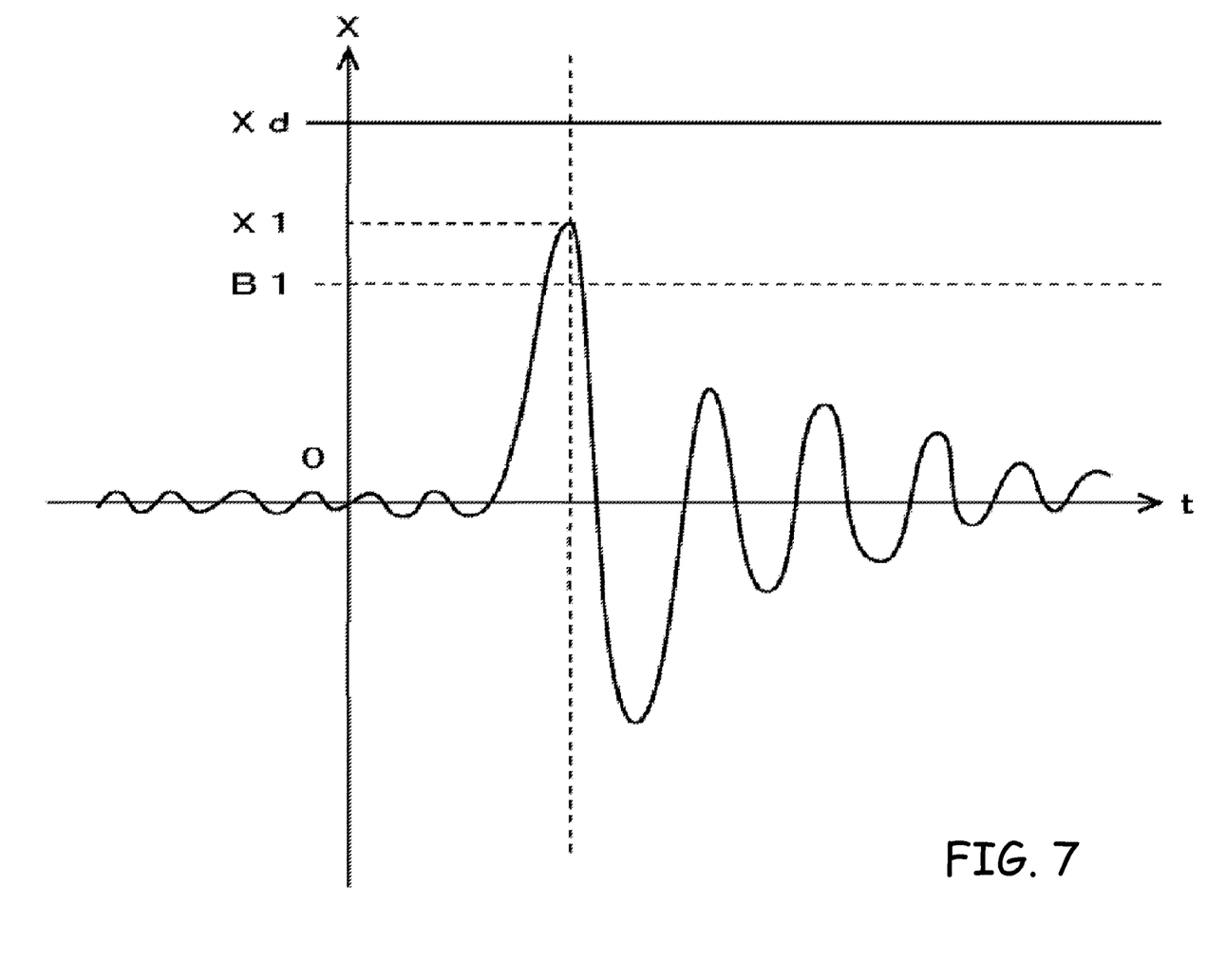
FIG. 7 is a diagram illustrating a relation between clearance and displacement of the rotating body which relation is observed when products are accumulated.

However, at or after the estimated time point of contact (t1), actual contact may occur when the displacement X is located at X1 (smaller than the clearance Xd) before reaching Xd as illustrated in FIG. 5 and FIG. 7. In this state, the contact occurs in spite of the presence of the clearance in mechanical design, and the cause of this contact is expected to be a decrease in clearance resulting from accumulation of products. Thus, comparison between the clearance in mechanical design and the amount of actual deflection enables determination of whether contact with products has occurred. At this time, for comparison with the amount of actual deflection, it is preferable to use not only the clearance in mechanical design but also a predetermined value set based on the clearance in mechanical design (for example, approximately 90% of the clearance in mechanical design) or a predetermined value set by estimating the amount of products accumulated.

The amount of products accumulated $\Delta X$ can be estimated by $\Delta X = Xd - X1$.

Even if the amount of unbalance has increased as a result of attachment of products to the rotating body 103 side, whether contact with products has occurred can be similarly determined based on the comparison between the clearance in mechanical design and the amount of actual deflection.

As described in Embodiment 2, even for external vibration, the displacement sensor for the magnetic bearings detects the relative displacement between the rotating body 103 and the stator in real time to enable the determination based on the comparison between the clearance in mechanical design and the amount of actual deflection.

The estimated time point of contact caused by external impact or an increase in the amount of unbalance is determined based on an amplitude associated with the relative displacement between the rotating body 103 and the stator. Thus, the determination can be made regardless of the rigidity of the magnetic bearings, that is, regardless of whether the rigidity is high or low.

By way of example, the threaded spacer has been described as the stator portion with which the rotating body comes into contact. However, the stator portion is not limited to the threaded spacer. For example, the stator portion may be a protective bearing used as a backup component for the magnetic bearings.

As described above, the state of the physical contact between the rotating body 103 and the stator can be perceived by analyzing the displacement signal from the upper radial sensor 107, the lower radial sensor 108, and the axial sensor 109 originally disposed on the magnetic bearings without the need to install the vibration sensor 201. Furthermore, the cause of the contact can be determined.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump comprising:
   a rotating body displacement detecting means which detects displacement of a rotating body as a signal;
   a threshold of rotating body displacement which is set to the signal of the displacement;
   a contact determining means which determines a time point when the signal of the displacement exceeds the threshold of rotating body displacement to be an estimated time point of a contact;
   a storing means which stores the signal of the displacement;
   a threshold of stored rotating body displacement which is set to the signal of the displacement obtained before the estimated time point of the contact and stored in the storing means; and
   an abnormality cause estimating means which estimates a cause of the contact depending on whether or not the signal of the displacement obtained before the estimated time point of the contact and stored in the storing means exceeds the threshold of stored rotating body displacement.

2. The vacuum pump according to claim 1, wherein the abnormality cause estimating means estimates that the contact is caused by external impact or accumulation of products when the signal of the displacement obtained before the estimated time point of the contact and stored in the storing means does not exceed the threshold of stored rotating body displacement.

3. The vacuum pump according to claim 1, wherein, at or after the estimated time point of the contact, the cause of the contact is estimated to be accumulation of products based on a difference between a maximum value of a displacement of the rotating body and an amount of clearance between the rotating body and a stator portion opposite to the rotating body or a predetermined value that is set based on the amount of clearance.

4. The vacuum pump according to claim 1, wherein the cause of the contact is estimated based on a number of times that the signal of the displacement obtained before the estimated time point of the contact and stored in the storing means exceeds the threshold of stored rotating body stored displacement.

5. A vacuum pump comprising:
  a stator portion physical quantity detecting means which detects a physical quantity of a stator portion as a physical quantity signal;
  a threshold of stator portion physical quantity which is set to the physical quantity signal;
  a contact determining means which determines a time point when the physical quantity signal exceeds the threshold of stator portion physical quantity to be an estimated time point of a contact;
  a rotating body displacement detecting means which detects displacement of a rotating body as a displacement signal;
  a storing means which stores the displacement signal;
  a threshold of stored rotating body stored displacement which is set to the displacement signal obtained before the estimated time point of the contact and stored in the storing means; and
  an abnormality cause estimating means which estimates a cause of the contact depending on whether or not the displacement signal obtained before the estimated time point of the contact and stored in the storing means exceeds the threshold of stored rotating body displacement.

6. The vacuum pump according to claim 5, wherein the physical quantity of the stator portion is acceleration of the stator portion or force acting on the stator portion.

7. The vacuum pump according to claim 5, wherein the physical quantity of the stator portion is a physical quantity corresponding to a result of a predetermined number of differentiations or integrations of acceleration of the stator portion.

8. The vacuum pump according to claim 5, further comprising:
  a storing means for storing the physical quantity; and
  a threshold of stored stator portion physical quantity which is set to the physical quantity signal obtained before the estimated time point of the contact and stored in the storing means,
  wherein the abnormality cause estimating means estimates that the contact is caused by an increase in an amount of unbalance of the rotating body or accumulation of products when the physical quantity signal obtained before the estimated time point of the contact and stored in the storing means does not exceed the threshold of stored stator portion physical quantity.

9. The vacuum pump according to claim 5, wherein the abnormality cause estimating means estimates that the contact is caused by external impact or accumulation of products when the displacement signal obtained before the estimated time point of the contact and stored in the storing means does not exceed the threshold of stored rotating body displacement.

10. The vacuum pump according to claim 5, wherein, at or after the estimated time point of the contact, the cause of the contact is estimated to be accumulation of products based on a difference between a maximum value of a displacement of the rotating body and an amount of clearance between the rotating body and a stator portion opposite to the rotating body or a predetermined value that is set based on the amount of clearance.

11. The vacuum pump according to claim 5, wherein the cause of the contact is estimated based on a number of times that the displacement signal obtained before the estimated time point of the contact and stored in the storing means exceeds the threshold of stored rotating body displacement.

12. An abnormality cause estimating method for a vacuum pump, the method comprising:
  detecting displacement of a rotating body as a signal based on the detected displacement;
  storing the signal of the displacement in a storing means;
  determining a time point when the signal of the displacement exceeds a threshold of rotating body displacement to be an estimated time point of a contact; and
  estimating a cause of the contact depending on whether or not the signal of the displacement obtained before the estimated time point of the contact and stored in the storing means exceeds a threshold of stored rotating body displacement.

13. An abnormality cause estimating method for a vacuum pump, the method comprising:
  detecting a physical quantity of a stator portion as a physical quantity signal;
  storing the physical quantity signal in a storing means;
  determining a time point when the physical quantity signal exceeds a threshold of stator portion physical quantity to be an estimated time point of a contact; and
  estimating a cause of the contact depending on whether or not the physical quantity signal obtained before the estimated time point of the contact and stored in the storing means exceeds a threshold of stored stator portion physical quantity.

* * * * *